No. 729,876.

Patented June 2, 1903.

UNITED STATES PATENT OFFICE.

RUDOLF LESSER, OF BERLIN, GERMANY.

PROCESS OF MAKING SUBSTITUTION PRODUCTS OF AROMATIC AMINS.

SPECIFICATION forming part of Letters Patent No. 729,876, dated June 2, 1903.

Application filed November 3, 1902. Serial No. 129,985. (No specimens.)

*To all whom it may concern:*

Be it known that I, RUDOLF LESSER, of 35 Victoriastrasse, Berlin, Germany, have invented new and useful Improvements in the Manufacture of Nitro and Halogen Substitution Products of Aromatic Amins, of which the following is a specification.

For the production of nitro or halogen substitution products of aromatic amins several methods have hitherto been used which consist in producing amins of acetyl, benzoyl, benzylidin, &c., introducing into these the halogen or nitro group, and thereafter saponifying the product with acids or alkalies. These methods have all the drawback that the radical introduced with the amido group is completely lost during the saponification, or, for example, it can only be recovered when benzyliden anilin is used with considerable loss in the form of benzaldehyde.

The object of this invention is to provide a method whereby all these objections are avoided and whereby it is possible to obtain nitro and halogen substitution products of those aromatic amins which form condensation products with phthalic anhydrid, the condensation products themselves being recovered. Thus aromatic bases of negative substitution are obtained, in the first place, by introducing the halogen or nitro group into the corresponding phthalimids of the type

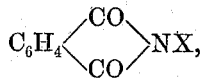

in which X represents an aromatic radical, and by decomposing the compounds thus obtained with the primary or other amins; secondly, by introducing the halogen or nitro group into the corresponding phthalamin acids of the type

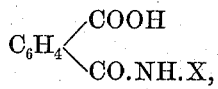

in which X indicates the same aromatic radical, and by decomposing the compounds, as in the previous example; thirdly, by introducing the halogen or nitro group into the phthalimids mentioned under I and converting the substitution products thus obtained by heat with an equivalent quantity of caustic alkali into phthalamin acids named under II, which are split in the manner indicated.

The method will be explained by way of the following examples:

*I. Production of para-nitranilin.*—2.23 kilograms of phthalanilin finely ground are dissolved on being stirred and slightly heated in fourteen kilograms sulfuric acid of 66° Baumé, and the liquid is then cooled by a cold mixture to 0° centigrade, whereby the dissolved phthalanilin is partly again separated. Thereafter 2.5 kilograms of a nitrifying-acid containing twenty-six per cent. $HNO_3$ are introduced slowly in such a manner that the temperature does not exceed +3° centigrade. After nitrification the stirring at 0° centigrade is continued for a short time, whereupon the mass is poured out on ice and the nitrophthalanilin produced is promptly separated and washed until the washing-water is no longer acid. The nitrophthalanilin is then dried and heated with 1.1 kilograms anilin in a pressure-receptacle for half to one hour up to 170° to 180° centigrade, whereby the contents are rendered liquid. After cooling, the contents are treated with steam in order to drive over some excess of anilin and some ortho-nitranilin. From the residue the para-nitranilin is obtained by boiling with water, while phthalanilin forms the remainder, which by gentle heating to about 150° centigrade is freed from water and after pulverization is immediately used again for nitrification. The temperature during the heating with anilin varies from 100° centigrade to 180° centigrade, according to the amount of water contained.

*II. Production of dinitranilin, (2.4.)*—2.23 kilograms phthalanilin are dissolved on being slightly heated and stirred in fourteen kilograms sulfuric acid of 66° Baumé. After the liquid is cooled with ice to 0° centigrade, whereby a part of the dissolved phthalanilin is again separated, a slow addition of five kilograms of a nitrifying-acid containing twenty-six per cent. $HNO_3$ is made upon thoroughly stirring and cooling with ice. After nitrification stirring at 0° centigrade is continued for an hour and the liquid poured on ice, whereby the dinitrophthalanilin is separated in the form of a solid yellow mass. This is pressed, washed with water, and dried.

After drying it is heated with 1.1 kilograms anilin in an open boiler for half an hour to 180° centigrade. The molten mass is treated with cold acetone, which easily dissolves the dinitranilin produced, while the greatest part of the phthalanilin remains as residue. The dissolved phthalanilin separates after the greatest part of the acetone is distilled off. The dinitranilin is separated from the mother liquid by precipitation with water and recrystallized from glacial acetic acid for the purpose of further purification. The recovered phthalanilin can after drying be used for a fresh operation.

III. *The production of 2-nitro-para-toluidin.*—2.37 kilos of para-tolylphthalimid are dissolved on being moderately heated and stirred in fourteen kilos sulfuric acid of 66° Baumé. After cooling the liquid to 0° centigrade, 2.5 kilograms of a nitrifying-acid containing twenty-six per cent. $HNO_3$ are slowly admitted while stirring and ice-cooling is continued. After nitrification, stirring is continued for a short time and the liquid poured on ice. The nitro-para-tolylphthalimid separates in the form of a solid white mass. The melting-point of the combination after recrystallization from glacial acetic acid, from which it is obtained in the form of white silk-like needles, is 225° centigrade. The nitro compound is separated, washed, and dried. Thereafter it is heated in a pressure-receptacle with 1.15 kilograms para-toluidin for half an hour to 210° centigrade. The molten mass is boiled with diluted hydrochloric acid, which leaves the para-tolylphthalimid as a residue in undissolved condition, while the 2-nitro-para-toluidin produced dissolves. The latter is precipitated by soda and after being pressed off is purified by recrystallization from water. In the same manner the conversion with anilin is effected, except that in this case phthalanilin is recovered.

IV. *Production of 5 (or 4) nitro-2-amidobenzoic acid.*—2.67 kilograms of phtalyl-ortho-imidobenzoic acid are dissolved in 15 kilograms of sulfuric acid of 66° Baumé. To this liquid, cooled with ice, 2.6 kilograms of a nitrifying acid containing twenty-six per cent. $HNO_3$ are slowly added while thoroughly stirring the mass. After nitrification, stirring is continued for a short time in the cold and the liquid is poured on ice. The nitro compound separated in the form of a yellow mass is pressed, washed, and dried, after which it is heated with two kilograms anilin for half an hour in a retort with a reflex condenser to 180° centigrade. The molten mass is then boiled in a solution of soda, leaving phthalanilin in the residue. The excess of anilin is driven off from the solution of soda with the aid of steam, and the nitro-amidobenzoic acid is precipitated by acetic acid or a careful addition of mineral acid. It crystallizes from dilute alcohol in the form of fine yellow needles, which decompose at 265° to 267° centigrade, and is probably a mixture of the (penta) 5 and 4 (tetra) nitro-2-amidobenzoic acids.

V. *Production of para-nitranilin.*—22.3 kilograms phthalanilin are finely ground and boiled with four kilograms of caustic soda (NaOH) and thirty-six kilograms water until dissolution takes place. To the cooled solution dilute sulfuric acid is added while stirring until acid, whereby the phthalanilin acid is separated as a white mass. It is pressed and washed with little water. The melting-point of the phthalanilin acid recrystallized from dilute alcohol is 170° to 171° centigrade. The phthalanilin acid is after drying brought into one hundred and seventy kilograms cold sulfuric acid of 66° Baumé while stirring. All being dissolved, twenty-five kilograms of a nitrifying-acid of twenty-six per cent. $HNO_3$ are admitted on stirring and cooling with ice. After nitrification, stirring is continued for half an hour in the cold, and then the liquid is poured on ice, whereby nitro-phthalanilin acid is eliminated in the form of a solid yellow mass. The latter is pressed and dried. By dissolving in soda and precipitation with a determined quantity of a dilute mineral acid almost pure para-nitrophthalanilin acid can be produced. The raw acid still contains slight quantities of ortho-nitro-phthalanilin acid, from which it is separated by recrystallization from dilute alcohol, and thus can be produced chemically pure. The melting-point of the purified para-nitro-phthalanilin acid is 195° centigrade, (corrected.) Water is separated and immediate solidification of the molten mass takes place, which then melts at 268° to 269° centigrade, (corrected,) and thus has been converted into para-nitro-phthalanilin. The raw nitro-phthalanilin acid is after drying heated in a retort with downwardly-directed condenser while stirring with eighteen kilograms anilin for several hours—i. e., heated to 120° to 130° centigrade—until a sample or test taken from the mass proves to contain no more nitro-phthalanilin acid. This point being reached, the process is carried out, as indicated in Example I, for obtaining pure nitranilin from the molten mass containing besides para- and ortho-nitranilin the reconverted phthalanilin.

VI. *Production of para-nitranilin.*—26.8 kilograms nitro-phthalanilin produced according to the process specified in Example I are boiled with four kilograms of soda (NaOH) and seventy-six kilograms water until dissolved. After filtration and cooling, diluted acid is added until the solution is acid. The precipitated nitro-phthalanilin acid is separated and dried. It contains, like the nitro-phthalanilin acid produced in Example V, much para with little ortho-nitro-phthalanilin acid. The conversion with anilin takes place in the same manner as shown in Example V.

I claim—

1. The process for the production of nitro and halogen substitution products of those aromatic amins, which form condensation products with phthalic anhydrid, which consists in introducing the halogen or nitro group into the corresponding phthalimids and decomposing these with amins.

2. The process for the production of nitro and halogen substitution products of those aromatic amins, which form condensation products with phthalic anhydrid, which consists in introducing the halogen or nitro group into the corresponding phthalamin acids and decomposing these with aromatic amins.

3. The process for the production of nitro and halogen substitution products of those aromatic amins, which form condensation products with phthalic anhydrid, which consists in introducing the halogen or nitro group into the corresponding phthalimids converting these into the corresponding phthalamin acids and decomposing these with aromatic amins.

In testimony whereof I affix my signature in presence of two witnesses.

RUDOLF LESSER.

Witnesses:
JEAN GRUND,
CARL GRUND.